United States Patent [19]

Schuh

[11] Patent Number: 4,928,400
[45] Date of Patent: May 29, 1990

[54] BEARING CLEARANCE DETECTOR

[76] Inventor: David N. Schuh, 300, 1615 - 10th Avenue S.W., Calgary, Alberta, Canada, T3C 0J7

[21] Appl. No.: 145,503

[22] Filed: Jan. 19, 1988

[51] Int. Cl.$^5$ .............................................. G01B 5/14
[52] U.S. Cl. .................. 33/605; 33/DIG. 15; 33/833
[58] Field of Search ............ 33/DIG. 15, 169 R, 605, 33/833

[56] References Cited
U.S. PATENT DOCUMENTS 1,758,271  5/1930  Zitzmann ...................... 33/DIG. 15
2,426,955  9/1947  Stroup ......................... 33/DIG. 15

FOREIGN PATENT DOCUMENTS 684213  1/1932  France ......................... 33/DIG. 15

Primary Examiner—Harry N. Haroian
Attorney, Agent, or Firm—George Haining Dunsmuir

[57] ABSTRACT

A relatively simple device for measuring such variables as piston wrist pin and connecting rod big end clearances in internal combustion engines includes a cylindrical casing with a threaded front end for mounting in a spark plug hole; an elongated, arcuate wire probe slidable in a sleeve on such front end for engaging the top end of a piston; a plunger slidably mounted in the casing and extending beyond the other end of the casing to a micrometer for measuring piston movement; and air and oil lines extending through the casing to such front end for introducing a vacuum, air or oil to the cylinder for various measuring procedures.

7 Claims, 2 Drawing Sheets

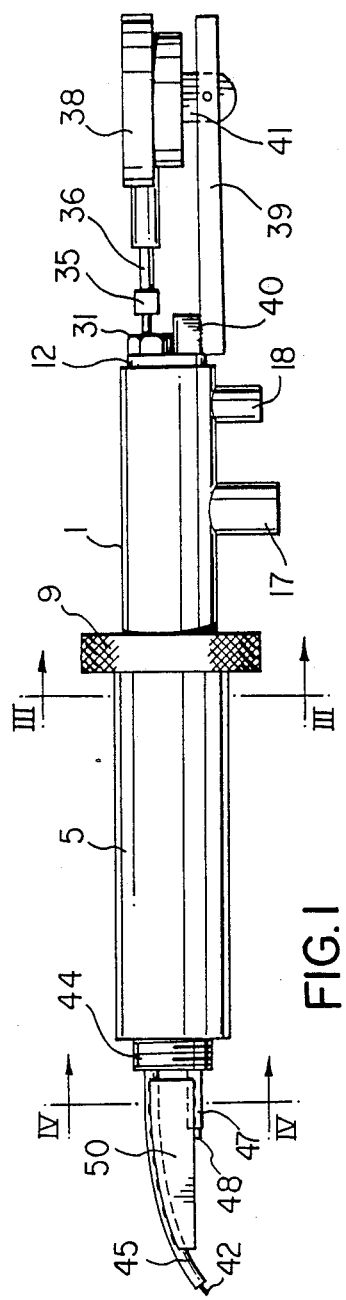
FIG. 1
FIG. 4
FIG. 3

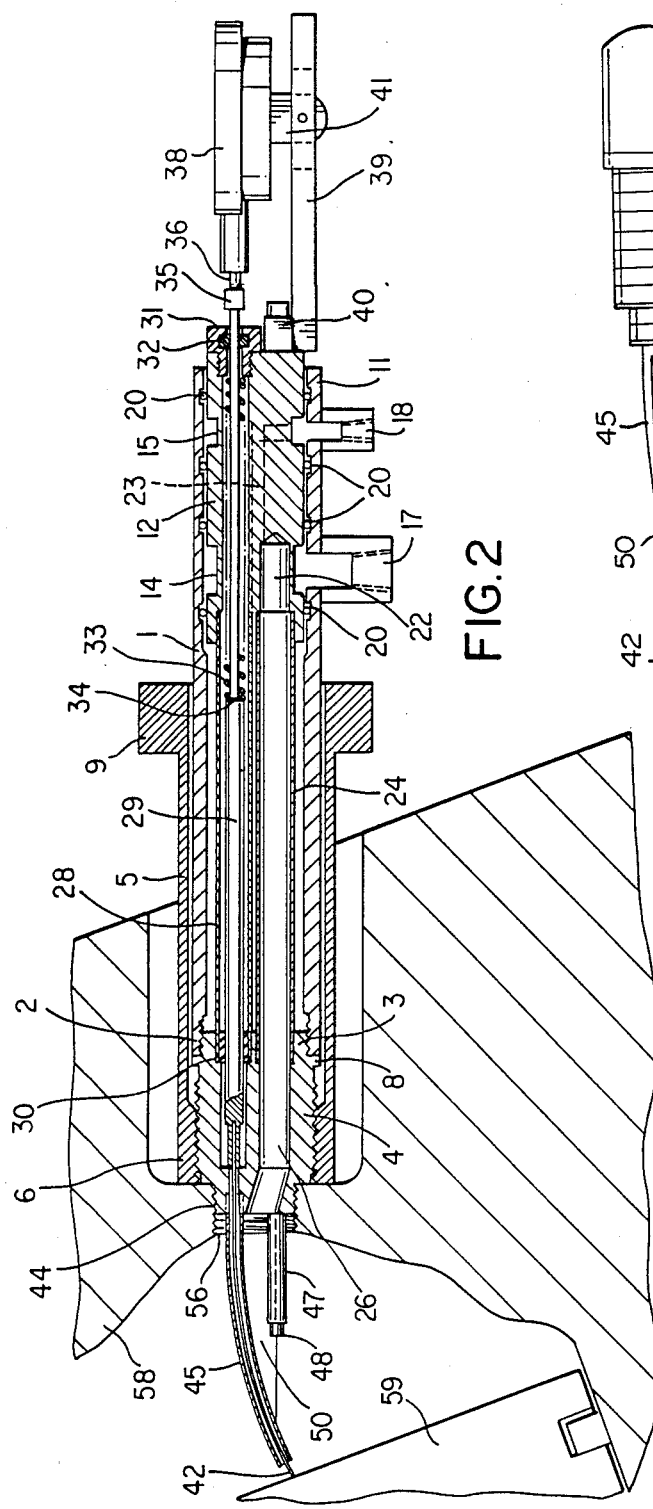
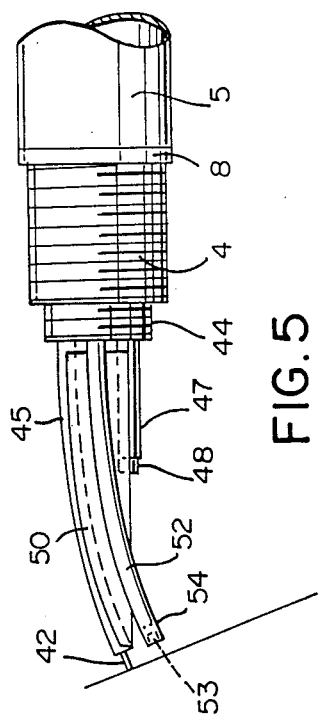
FIG. 2
FIG. 5

BEARING CLEARANCE DETECTOR

BACKGROUND TO THE INVENTION

This invention relates to an engine testing device, and in particular to a device for measuring clearances in engines.

The measuring of piston wrist pin clearance, connecting rod big end clearance, and the degree of sealing by valves, gaskets and rings in an engine cylinder can be difficult and time consuming. A need exists for a device, which simplifies such procedures.

The object of the present invention is to meet the above-identified need by providing a relatively simple device for measuring piston wrist pin and connecting rod clearances, and for determining the tightness of the seals in an engine cylinder.

BRIEF SUMMARY OF THE INVENTION

Accordingly, the present invention relates to a measuring device for use in detecting clearances in an engine cylinder comprising tubular casing means with closed ends for insertion into an engine cylinder; plunger means slidable in said casing means and extending beyond said closed ends of said casing means; probe means engaging one end of said plunger means for engaging a piston in the cylinder; spring means in said casing means for biasing said plunger means against said probe means, and consequently said probe means against the piston; and micrometer means on the other end of said casing means for engagement by said plunger means to provide an indication of piston movement.

The invention will be described in greater detail with reference to the accompanying drawings, which illustrate a preferred embodiment of the invention, and wherein:

FIG. 1 is a side elevation view of a measuring device in accordance with the present invention with parts omitted;

FIG. 2 is a longitudinal sectional view of the device of FIG. 1 mounted in an engine cylinder;

FIG. 3, which appears on the first sheet of drawings, is a cross section taken generally along line III—III of FIG. 1;

FIG. 4, which appears on the first sheet of drawings, is a cross section taken generally along line IV—IV of FIG. 1; and FIG. 5 is a side elevation view of one end of the device of FIGS. 1 to 4 with a part removed.

DESCRIPTION OF THE PREFERRED EMBODIMENT(S)

In the following description, the terms "front" and "rear" have been used to describe portions of the device farthest away from and closest to the user, respectively.

With reference to the drawings, the device of the present invention includes an elongated tubular casing 1 with an internally threaded, front end 2 for receiving one external threaded rear end 3 of a plug 4. The plug 4 carries a cylindrical sleeve 5, which has an internally threaded front end 6 for mating with the externally threaded central portion of the plug 4. An annular flange 8 on the plug 4 limits movement of the plug into the casing 1, and limits movement of the sleeve 5 rearwardly along the plug. An annular, radially outwardly extending flange 9 is provided on the rear end of the sleeve 5. The outer periphery of the flange 9 is knurled, so that the flange can be used as a handle for manual rotation of the sleeve 5.

The other, rear end 11 of the casing 1 is closed by a second, elongated plug 12. The plug 12 contains annular grooves defining annular passages 14 and 15 for receiving air under pressure through an inlet duct 17 and oil through an inlet duct 18, respectively. The passages 14 and 15 are sealed in the casing 1 by O-rings 20. The air and oil entering the casing 1 flows through longitudinally extending passages 22 and 23, respectively in the plug 12 which connect the passages 14 and 15 to the tubes 24 and 25 (FIG. 3) extending between the plugs 4 and 12. Longitudinally extending passages 26 (one shown) in the plug 4 carry air and oil therethrough.

A third tube 28 carrying a plunger 29 extends between the inner ends of the plugs 4 and 12. The plunger 29 extends from beyond the front end of the casing 1 completely through the plug 12 to beyond the rear, outer end thereof. The plunger 29 is slidably supported in the casing 1 by a brass bushing 30 in the front end of the tube 28 and by a tubular, externally threaded, brass bushing 31 and an O-ring 32 in the rear, outer end of the plug 12. A helical spring 33 extending between a shoulder 34 on the middle of the plunger 29 and the bushing 31 biases the plunger towards the front end of the casing 1.

A head 35 on the rear, outer end of the plunger 29 receives the outer free end of the plunger 36 of a guage 38. The gauge 38 is a disc-shaped micrometer for providing an indication of plunger stroke, i.e. the distance moved by the plunger 29. The gauge 38 is carried by the elongated stem 39 of the generally T-shaped bracket 40, which is mounted on the outer, rear end of the plug 12. A lug 41 on the bottom of the gauge 38 extends into a slot in the stem 39 of the bracket 40.

The other or front end of the plunger 29 carries a probe 42 defined by an elongated wire, which extends outwardly through the threaded, reduced diameter outer, front end 44 of the plug 4 and through an arcuate guide sleeve 45. As best shown in FIGS. 4 and 5, sleeve 45 is maintained in a fixed position with respect to the plug 4 by a short tube 47 with a plug 48 in the outer end thereof, and by reinforcing plates 50. The plates 50 are silver brazed to the sleeve 45 and to the tube 47. Oil is carried from the passage in the plug 4 by an arcuate tube 52. A plug 53 blocks the outer end of the tube 52 so that any oil flowing there-through is sprayed outwardly through holes 54 in the side wall of the tube slightly upstream of the plug 53.

Operation of the device is quite simple. During use, the threaded front end 44 of the plug 4 is inserted into a threaded spark plug opening 56 in an internal combustion cylinder 58 and rotated. The device can also be inserted into the diesel injector hole of a diesel engine.

The sleeve 5 permits locking of the device in the required angular position so that the longitudinal axis of the front end of the curved probe guide sleeve 45 is parallel to the axis of the bore of the cylinder 58. When the probe sleeve 45 is in the proper angular position, the sleeve 5 is rotated until the front end 6 thereof contacts the spark plug gasket seat. Thus, the measuring device is no longer free to wiggle due to the looseness provided by normal spark plug thread clearance. The plug 4 can be changed, i.e. the probe nose piece or front end 44 mounting threads can be changed to suit different spark plug or injector openings.

The device is connected by hoses (not shown) to an auxilliary cart which provides the required vacuum, air pressure, flow measurement, oil source and filters to operate the device.

The probe 42 engages the top end of a piston 59 so that movement of the latter toward the device causes a corresponding movement of the plunger 29. The spring 33 ensures that the probe 42 accurately follows movement of the piston 59. Plunger movement registers on the micrometer. When pressure on the probe 42 is released, the spring 33 moves the plunger toward the rest position.

The device can be used to measure piston wrist pin clearance and connecting rod big end bearing clearance, and to flow test an engine cylinder to determine how well the valves, gaskets and rings seal the cylinder. The flow test is performed dry (as the engine is found) and wet by using the tube 52 to spray oil onto the walls of the cylinder 58 in order to determine how much of any leakage is ring leakage. The degree of such leakage can readily be deduced, because the sprayed oil seals the rings, eliminating the ring leakage path.

Bearing clearances are measured by determining piston lifting when a vacuum is applied to the combustion chamber. The vacuum is applied through air duct 17, passage 22, tube 24 and passage 26. The vacuum is applied incrementally, and when sufficient force has been developed to overcome the weight of the piston 59 (but not of the connecting rod) the piston 59 rises through a distance indicative of wrist pin clearance. By applying a higher vacuum, sufficient force is developed to lift the connecting rod (but not the crankshaft) which provides an indication of connecting rod clearance.

Piston lift is measured by the probe 42 being in contact with the top of the piston 59 when the piston is forced down (by slight air pressure through duct 17, passage 22, tube 24 and passage 26) to its full down position with the crankshaft oriented angularly to top dead center of the piston. The arcuate probe 42 is designed to measure longitudinal motion of the piston, i.e. motion parallel to the longitudinal axis of the cylinder. The micrometer 38 provides a direct reading of piston lift.

What is claimed is:

1. A measuring device for use in detecting clearances in an engine cylinder comprising tubular casing means with closed ends for insertion into an engine cylinder; plunger means slidable in said casing means and extending beyond said closed ends of said casing means; probe means engaging one end of said plunger means for engaging a piston in the cylinder; spring means in said casing means for biasing said plunger means against said probe means, and consequently said probe means against the piston; a first fluid passageway communicating said engine cylinder with a source of fluid alternatively under pressure and vacuum, a second fluid passageway communicating said engine cylinder with a source of a lubricating fluid, and micrometer means on the other end of said casing means for engagement by said plunger means to provide an indication of piston movement in response to fluid pressure and vacuum in said first fluid passageway.

2. A measuring device according to claim 1, including first plug means closing one end of said casing means for insertion into the engine cylinder and for slidably supporting one end of said plunger means; and second plug means closing the other end of said casing means for slidably supporting the other end of said plunger means.

3. A measuring device according to claim 2, said first fluid passageway extends through each said first and second plug means for introducing air or a vacuum into the cylinder; said second fluid passageway extends through each said first and second plug means for introducing oil into the cylinder; and a third passageway extending through each said first and second plug means for slidably supporting said plunger means.

4. A measuring device according to claim 3, including a threaded nose piece on said first plug means extending out of the casing means for engaging a threaded opening in an engine cylinder.

5. A measuring device according to claim 4, including sleeve means on said casing means for movement against the cylinder to secure the device in one position.

6. A measuring device according to claim 5, including guide tube means on said nose piece for guiding said probe means and facilitating alignment of the outer free end thereof with the longitudinal axis of the piston.

7. A measuring device according to claim 6, wherein said guide tube means is arcuate, curving with respect to the longitudinal axis of said casing means.

* * * * *